(12) United States Patent
Su et al.

(10) Patent No.: US 12,730,044 B2
(45) Date of Patent: Sep. 8, 2026

(54) HIGH-WATER PRESSURE TRAPDOOR MODEL TEST DEVICE AND USE METHOD THEREOF

(71) Applicant: Shenzhen University, Guangdong (CN)

(72) Inventors: Dong Su, Guangdong (CN); Ruixiao Zhang, Guangdong (CN); Xiangsheng Chen, Guangdong (CN); Xingtao Lin, Guangdong (CN); Wenlong Han, Guangdong (CN)

(73) Assignee: Shenzhen University, Shenzhen (CN)

( * ) Notice: Subject to any disclaimer, the term of this patent is extended or adjusted under 35 U.S.C. 154(b) by 276 days.

(21) Appl. No.: 18/663,106

(22) Filed: May 14, 2024

(65) Prior Publication Data

US 2024/0295478 A1 Sep. 5, 2024

Related U.S. Application Data

(63) Continuation of application No. PCT/CN2023/131491, filed on Nov. 14, 2023.

(30) Foreign Application Priority Data

Nov. 14, 2022 (CN) ........................ 202211421637.9

(51) Int. Cl.

*G01N 3/12* (2006.01)
*G01N 3/02* (2006.01)
*G01N 3/06* (2006.01)

(52) U.S. Cl.

CPC ............... *G01N 3/12* (2013.01); *G01N 3/064* (2013.01)

(58) Field of Classification Search

CPC ............ G01N 3/12; G01N 3/064; G01N 3/02; G01N 33/24; G01N 3/08

See application file for complete search history.

(56) References Cited

FOREIGN PATENT DOCUMENTS

| | | | | |
|---|---|---|---|---|
| CN | 212254990 U | * 12/2020 | | G01N 15/08 |
| CN | 112504843 A | * 3/2021 | | G01N 3/08 |

* cited by examiner

*Primary Examiner* — Laura Martin
*Assistant Examiner* — Anthony W Megna Fuentes
(74) *Attorney, Agent, or Firm* — Birchwood IP

(57) ABSTRACT

The invention provides a high-water pressure trapdoor model test device and a use method thereof. The high-water pressure trapdoor model test device includes a PIV analysis unit, a liquid material, a solid material, pore water pressure gauges, first soil pressure sensors, second soil pressure sensors, third soil pressure sensors, a test box and a pressurizing unit. A box body of the test box is provided with an opening sealed by a base plate, a hole is formed in the base plate, a trapdoor is arranged at the hole, the third soil pressure sensors are arranged in the trapdoor, the first soil pressure sensors are arranged in the base plate, the solid material is placed on the base plate, the second soil pressure sensors and the pore water pressure gauges are arranged in the solid material, and the liquid material is placed on the solid material.

10 Claims, 4 Drawing Sheets

HIGH-WATER PRESSURE TRAPDOOR MODEL TEST DEVICE AND USE METHOD THEREOF

CROSS-REFERENCE TO RELATED APPLICATION

This application is a continuation of international application of PCT application serial no. PCT/CN2023/131491 filed on Nov. 14, 2023, which claims the priority benefit of China application no. 202211421637.9 filed on Nov. 14, 2022. The entirety of each of the above mentioned patent applications is hereby incorporated by reference herein and made a part of this specification.

BACKGROUND OF THE INVENTION

Technical Field

The invention relates to the technical field of geotechnical engineering, and particularly relates to a high-water pressure trapdoor model test device and a use method thereof.

Description of Related Art

The soil arching effect is a common phenomenon in geotechnical engineering. Up to now, researchers worldwide have carried out a great deal of research in model tests. However, existing study is mainly single-phase study that only takes into account solid materials in a dry state, and study on the two-phase soil arching effect in the presence of liquid is rare. In addition, existing test model devices do not take into account pretreatment of materials, leading to a low utilization rate of material performance.

Chinese patent application No. 202011376084.0 discloses a trapdoor model test device under static and dynamic load conditions and a test method thereof, the trapdoor model test device comprises a test box for containing soil, a loading mechanism, fixing units and a trapdoor module, and the trapdoor model is composed of a thin plate and springs arranged on the thin plate. The trapdoor model device takes into account the relationship between the displacement of a trapdoor and the pressure of soil on the trapdoor, but this patent cannot be used for studying the development law of the soil arching effect in the presence of liquid. Chinese patent application No. 201710306490.1 discloses a dynamic soil arching model test system and method based on a transparent soil technique, the test system can observe the evolution of the soil arching in real time, but it cannot realize study under a high pressure because of its limited pressure condition. The device disclosed by Chinese patent application No. 202020357272.8 and the device can test the soil arching effect of an overlapping tunnel in spaces of different widths; however, materials used by the test devices are not pretreated, and the pressure level that can be studied under the same condition is low. Chinese patent application No. 202020208108.0 and Chinses patent application Ser. No. 202010117689.1 disclose adjustable water and soil pressurizing devices, which can effectively study the seepage erosion law of tunnels at different positions in water-rich sand strata with different waterheads; however, the pressure in the test box cannot remain unchanged. Chinese patent application No. 201911252029.8 discloses a test device for simulating the dynamic soil arching effect of a scaffolding structure, which solves the problem of scarcity in study of the dynamic soil arching effect of the scaffolding structure; however, the test device does not take into account the problem of sealing in the presence of liquid, making it difficult to explore the evolution pattern of soil arching under the two-phase condition.

BRIEF SUMMARY OF THE INVENTION

The invention provides a high-water pressure trapdoor model test device, comprising a PIV analysis unit, a liquid material, a solid material, pore water pressure gauges, soil pressure sensors, a test box and a pressurizing unit, wherein the soil pressure sensors comprise first soil pressure sensors, second soil pressure sensors and third soil pressure sensors, a box body of the test box is provided with an opening which is sealed by a base plate, a hole is formed in the base plate, the trapdoor is arranged at the hole and able to move upwards and downwards, the third soil pressure sensors are arranged in the trapdoor, the first soil pressure sensors are arranged in the base plate, the solid material is placed on the base plate, the second soil pressure sensors and the pore water pressure gauges are arranged in the solid material, the liquid material is arranged on the solid material, a set space allowing a gas to be filled therein is reserved between the liquid material and an inner wall of a top cover of the box body of the test box, the pressurizing unit is connected to the test box and is used for filling the gas in the test box, and the PIV analysis unit is used for recording the development and intensification law of soil arching effect within the test box.

As a further improvement of the invention, the base plate comprises a first cushion block, a prop and a base, the prop is mounted below the first cushion block and located on the base, and the first soil pressure sensors are arranged in the first cushion block.

As a further improvement of the invention, the trapdoor comprises a trapdoor module and a driving device for driving the trapdoor module to move upwards and downwards; and the trapdoor module comprises a second cushion block, a telescopic prop and a pedestal, the second cushion block is mounted on the pedestal by means of the telescopic prop, and the third soil pressure sensors are arranged in the second cushion block.

As a further improvement of the invention, the base plate comprises multiple first cushion blocks and multiple props, and two props are mounted below each first cushion block; the trapdoor module comprises multiple second cushion blocks, and one or more second cushion blocks are mounted on the telescopic prop; and the trapdoor comprises one or more trapdoor module.

As a further improvement of the invention, the high-water pressure trapdoor model test device comprises multiple pore water pressure gauges, the solid material is filled in the test box layer-by-layer, and the second soil pressure sensors and the pore water pressure gauges are arranged on each layer of the solid material at a set interval in a horizontal direction and a vertical direction of the high-water pressure trapdoor model test device respectively.

As a further improvement of the invention, the top cover, a left wall, a right wall and a rear panel of the box body of the test box are provided with bulges which protrude outwards, and an observation window is arranged on the box body of the test box and located on a front panel of the box body of the test box.

As a further improvement of the invention, the top cover, the left wall, the right wall and the rear panel of the box body of the test box are each provided with one or more bulges which protrude outwards; the multiple bulges on the top cover of the box body of the test box form a wavy shape; the top cover, the left wall, the right wall and the rear panel of the box body of the test box are made from steel plates or aluminum plates; and the observation window is a flat panel, and the flat panel is made from transparent organic glass.

As a further improvement of the invention, the solid material comprises sand, soil, gravel and glass beads, and the liquid material comprises water, glycerin and mud; the PIV analysis unit comprises a camera device and a PIV analysis system used for recording the development and intensification law of soil arching effect within the test box; the high-water pressure trapdoor model test device further comprises a vent pipe and a sealing ring, a through-hole is formed in the box body of the test box, the vent pipe has an end penetrating through the through-hole to enter the box body of the test box as well as an end connected to the pressurizing unit, and the sealing ring is mounted between the vent pipe and the through-hole; and the high-water pressure trapdoor model test device further comprises a data collection system used for recording data on the soil pressure sensors and the pore water pressure gauges.

As a further improvement of the invention, the pressurizing unit comprises an air compressor, a pressure gauge and a data conditioning system, the data conditioning system is connected to the air compressor and the pressure gauge, the air compressor is connected to the pressure gauge, and the pressure gauge is connected to the vent pipe.

The invention discloses a use method of a high-water pressure trapdoor model test device, comprising:

Step 1, preparing a solid material according to a grading curve required by a test, and adding a liquid material of a corresponding concentration and comprising corresponding components according to test requirements;

Step 2, determining a number and moving direction of trapdoors, and ensuring that a trapdoor module is as high as a base plate before the test materials are filled;

Step 3, arranging third soil pressure sensors in a second cushion block of the trapdoor module, arranging first soil pressure sensors in a first cushion block of the base plate, filling the solid material in a test box layer-by-layer, and arranging second pressure sensors and pore water pressure gauges in the solid material at a set interval;

Step 4, reading data on the soil pressure sensors and the pore water pressure gauges, recording the data after the data become stable, then adding the liquid material into the test box to a specified level, and standing until read data become stable again;

Step 5, filling a gas into the test box according to a pressure condition required by the test; when a reading of a pressure gauge reaches a specified value, standing for a period of time, during which an air compressor remains continuously operational until the completion of the test;

Step 6, starting a PIV analysis unit, then starting the Trapdoor module, driving the Trapdoor module to ascend or descend, recording the development and intensification law of soil arching effect within the test box by the PIV analysis unit, and recording data on the soil pressure sensors and the pore water pressure gauges by a data collection system.

In Step 3, the second soil pressure sensors and the pore water pressure gauges are arranged on each layer of the solid material at the set interval in a horizontal direction and a vertical direction of the high-water pressure trapdoor model test device respectively In Step 5, a gas pressure in the test box is servo-controlled by the data conditioning system to ensure that the pressure in the test box is constant.

The invention has the following beneficial effects: 1, the high-water pressure trapdoor model test device provided by the invention can explore the formation and evolution mechanism of soil arching effect under a high-water pressure condition; 2, the high-water pressure trapdoor model test device provided by the invention can add different liquid materials as required by experimental study; 3, the high-water pressure trapdoor model test device provided by the invention takes into account pretreatment of model device materials, including arrangement of bulges and adoption of a wavy shape, thus realizing maximum utilization of the strength of the materials.

DETAILED DESCRIPTION OF THE INVENTION

Figure 1:
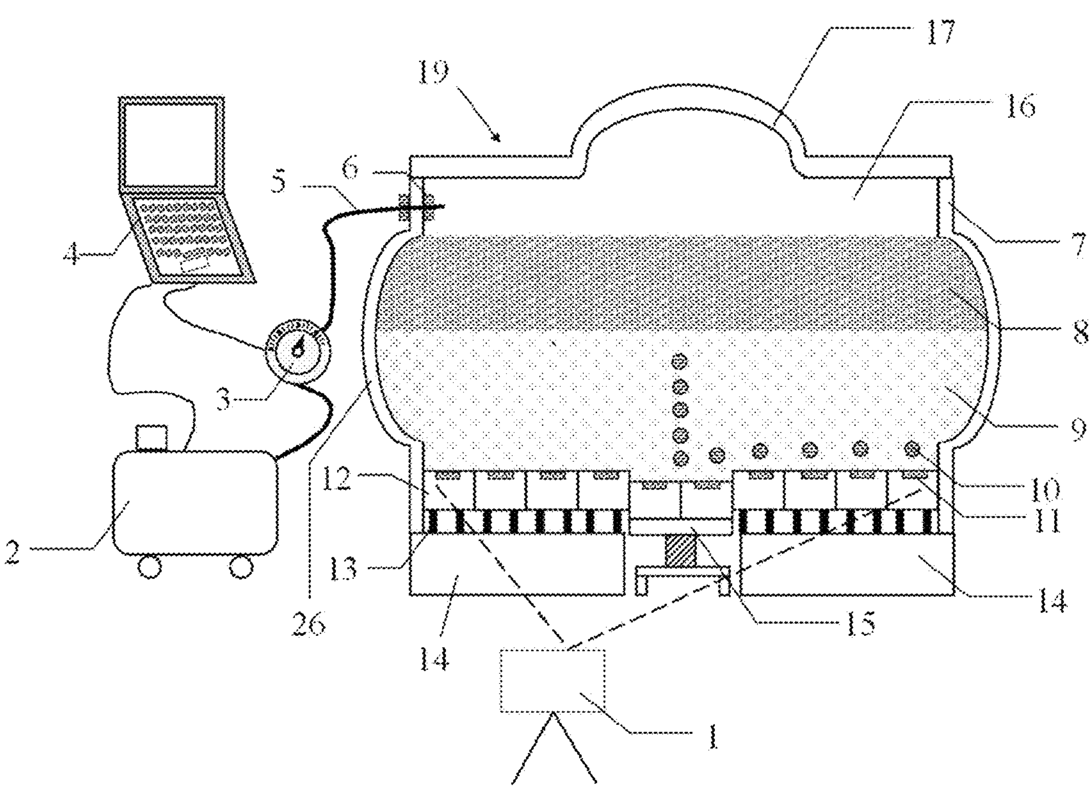
FIG. 1 is a sectional view of a high-water pressure trapdoor model test device according to the invention.
Figure 2:
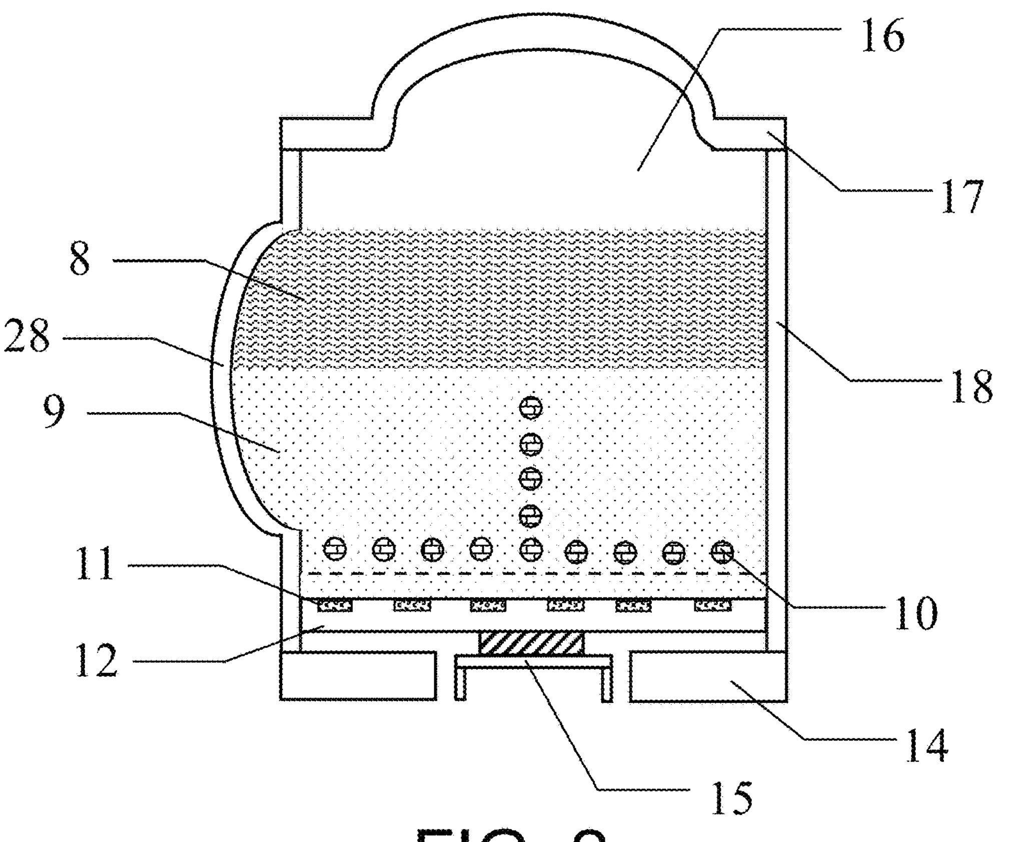
FIG. 2 is a sectional view of a side face of the high-water pressure trapdoor model test device according to the invention.

As shown in FIG. 1-FIG. 2, the invention discloses a high-water pressure trapdoor model test device, comprising a PIV analysis unit 1, a liquid material 8, a solid material 9, pore water pressure gauges 10, first soil pressure sensors 11, second soil pressure sensors, third soil pressure sensors 24, a test box 19, and a pressurizing unit, wherein a box body of the test box 19 is provided with an opening which is sealed by a base plate, a hole is formed in the base plate, a trapdoor is arranged at the hole and is able to move upwards and downwards, the third soil pressure sensors 24 are arranged in the trapdoor, the first soil pressure sensors 11 are arranged in the base plate, the solid material 9 is placed on the base plate, the second soil pressure sensors and the pore water pressure gauges 10 are arranged in the solid material 9, the liquid material 8 is placed on the solid material 9, a set space allowing a gas 16 to be filled therein is reserved between the solid material 8 and an inner wall of a top cover of the box body of the test box 19, the pressurizing unit is connected to the test box 19 and used for filling the gas 16 into the test box 19, and the PIV analysis unit 1 is used for recoding the development and intensification law of soil arching effect within the test box 19; and an observation window is arranged on the test box 19.

The top cover 17, a left wall 26, a right wall 7 and a rear panel 28 of the box body of the test box 19 are provided with bulges which protrude outwards, and the top cover 17 and the right wall 7 of the box body of the test box 19 are made from steel plates, aluminum plates or other materials; and the observation window in a front side of the test box 19 is made from transparent organic glass, and the transparent organic glass is a horizontal plane.

Figure 3:
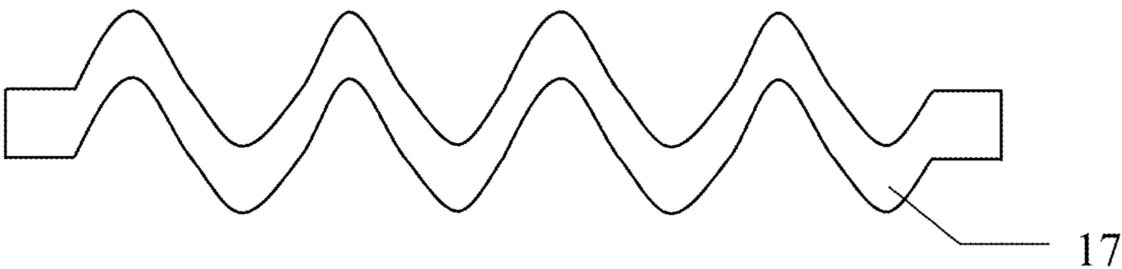
FIG. 3 is a structural view of a wavy top cover of the high-water pressure trapdoor model test device according to the invention.
Figure 4:
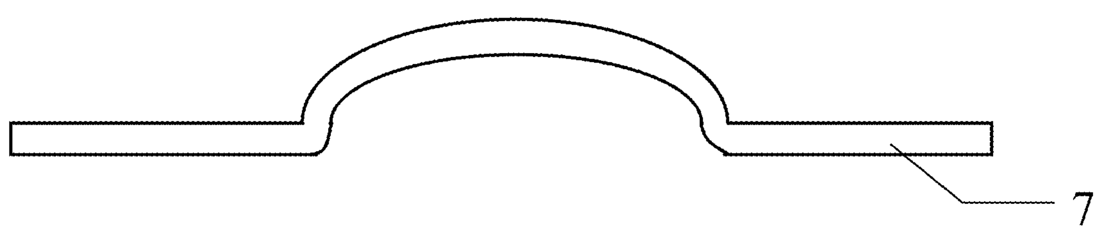
FIG. 4 is a structural view of a right wall, provided with one bulge, of the high-water pressure trapdoor model test device according to the invention.
Figure 5:
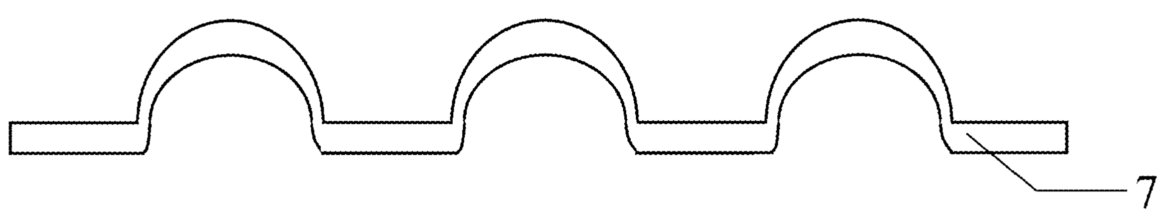
FIG. 5 is a structural view of a right wall, provided with multiple bulges, of the high-water pressure trapdoor model test device according to the invention.
Figure 6:
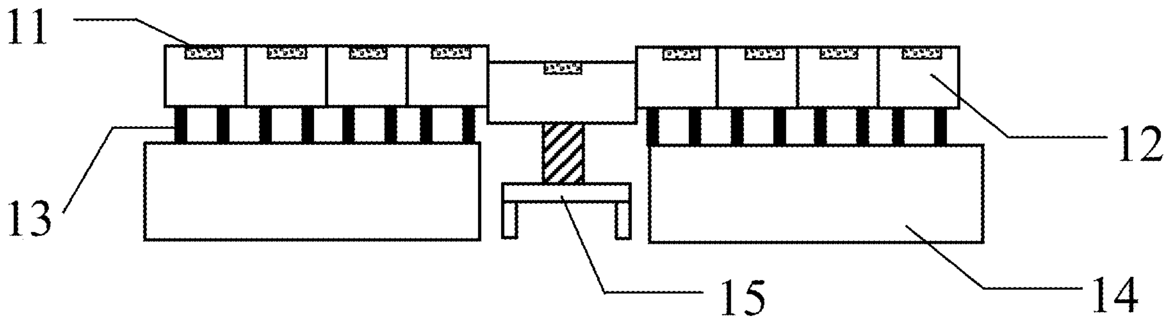
FIG. 6 is structural view of one Trapdoor module of the high-water pressure trapdoor model test device according to the invention.
Figure 7:
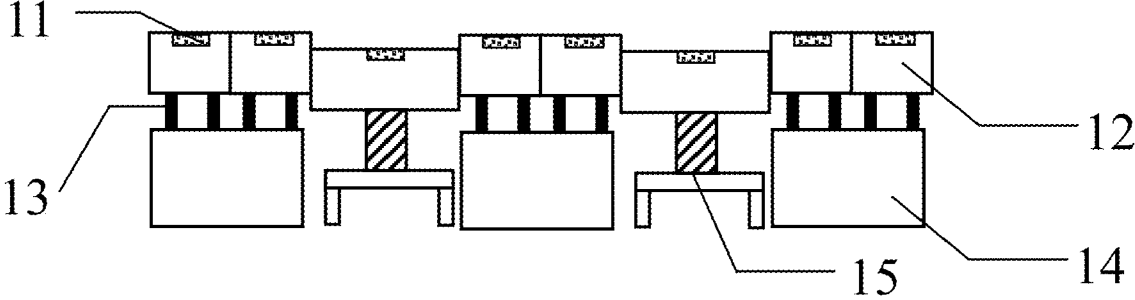
FIG. 7 is a structural view of multiple Trapdoor modules of the high-water pressure trapdoor model test device according to the invention.
Figure 8:
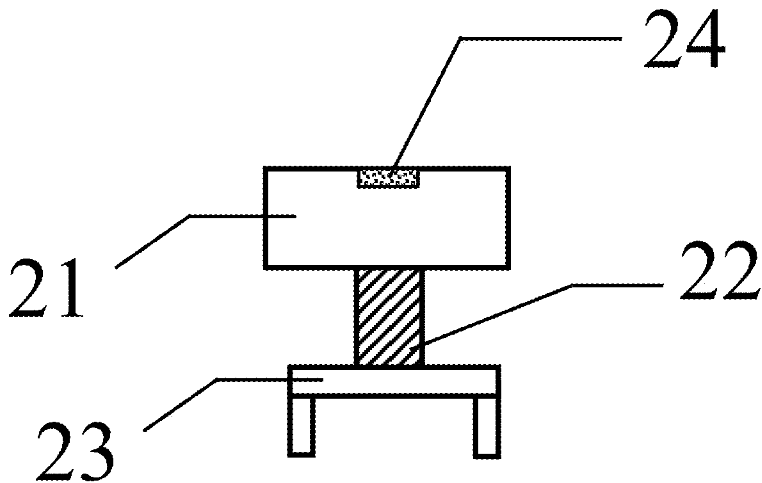
FIG. 8 is a structural view of the Trapdoor module having one second cushion block mounted thereon according to the invention.
Figure 9:
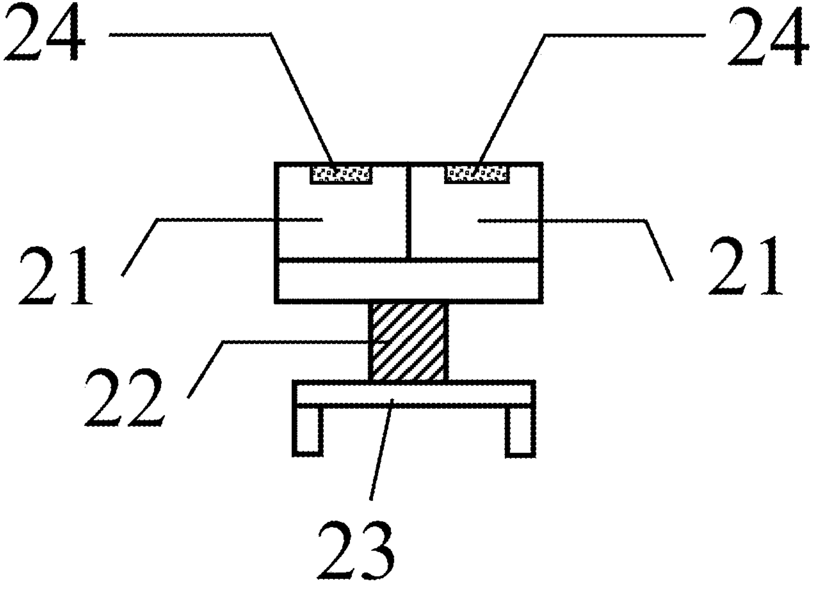
FIG. 9 is a structural view of the Trapdoor module having two second cushion blocks mounted thereon according to the invention.

As shown in FIG. 3-FIG. 5, the top cover 17 and the two walls of the test box 19 are each provided with one or more bulges which protrude outwards; and the bulges on the top cover 17 of the test box 19 form a wavy shape.

The solid material 9 is filled in the test box 19 layer-by-layer; after the solid material 9 is filled in the test box 19, the liquid material 8 is added into the box body of the test body 19 to a certain level, and a space allowing the gas 16 to be filled therein is reserved.

The second soil pressure sensors and the pore water pressure gauges 10 are arranged in the solid material 9 at a certain interval in a horizontal direction and a vertical direction of the high-water pressure trapdoor model test device respectively; the solid material 9 may comprise sand, soil, gravel and glass beads, et al; and the liquid material 8 may comprise water, glycerin and mud, et al.

The PIV analysis unit 1 comprises a camera device and a PIV analysis system used for recording the development and intensification law of soil arching effect within the test box 19; and the high-water pressure trapdoor model test device further comprises a data collection system used for recording data on the soil pressure sensors and the pore water pressure gauges 10.

As shown in FIG. 6-FIG. 9, a Trapdoor 15 is composed of a second cushion block 21, a telescopic prop 22 and a pedestal 23; the Trapdoor module 15 can move one or more second cushion blocks 21; and one or more Trapdoor modules 15 may be arranged.

The moving process of the Trapdoor module 15 is controlled by a driving device, and the driving device is preferably a servo control system; and the Trapdoor module 15 can move upwards and downwards.

The base plate is composed of first cushion blocks 12, props 13 and a base 14; and the first soil pressure sensors 11 are buried in the first cushion blocks 12.

The pressurizing unit is composed of an air compressor 2, a pressure gauge 3 and a data conditioning system 4; and the air compressor 2 is connected to the pressure gauge 3 by means of a vent pipe 5 and is connected into the test box 19.

The vent pipe 5 penetrates through a through-hole in the left wall 26 to enter the box body of the test box 19; and a sealing ring 6 is arranged between the vent pipe 5 and the through-hole in the left wall 26.

The pressurizing unit keeps the pressure in the test box 19 constant during the pressurizing process by serve control of the data conditioning system 4 according to data obtained by the pressure gauge 3.

The invention further discloses a use method of a high-water pressure trapdoor model test device, comprising:

Step 1, preparing a solid material 9 according to a particle size distribution curve required by a test, and adding a liquid material 8 of a corresponding concentration and comprising corresponding components according to test requirements;

Step 2, determining a number and moving direction of trapdoors, and ensuring that a Trapdoor module 15 is as high as a base plate before filling of the test materials;

Step 3, arranging third soil pressure sensors 24 in a second cushion block 21 of the Trapdoor module 15, arranging first soil pressure sensors 11 in a first cushion block 12 of the base plate, filling the solid material 9 in a test box 19 layer-by-layer, and arranging second pressure sensors and pore water pressure gauges 10 in each layer of the solid material 9 at a set interval in a horizontal direction and a vertical direction of the high-water pressure trapdoor model test device respectively;

Step 4, reading data on the soil pressure sensors and the pore water pressure gauges 10, recording the data after the data become stable, then adding the liquid material 8 into the test box 19 to a specified level without affecting a surface contour of the solid material, standing until read data become stable again, and recording the data, wherein the liquid material is not filled in the whole test box 19;

Step 5, filling a gas into the test box 19 according to a pressure condition required by the test; when a reading of a pressure gauge 3 reaches a specified value, standing for a period of time, during which an air compressor 2 remains continuously operational until the completion of the test; and the internal air pressure within the chamber is servo-controlled by a data adjustment system to ensure consistent pressure maintenance within the test chamber;

Step 6, starting a PIV analysis unit 2, then starting the Trapdoor module 15, driving the Trapdoor module 15 to ascend or descend, recording a soil arc development and intensification law in the test box 19 by the PIV analysis unit 1, and recording data on the soil pressure sensors and the pore water pressure gauges 10 by a data collection system.

The invention has the following beneficial effects: 1, the high-water pressure trapdoor model test device provided by the invention can explore the formation and evolution mechanism of soil arching effect under a high-water pressure condition; 2, the high-water pressure trapdoor model test device provided by the invention can add different liquid materials as required by experimental study; 3, the high-water pressure trapdoor model test device provided by the invention takes into account pretreatment of model device materials, including arrangement of bulges and adoption of a wavy shape, thus realizing maximum utilization of the strength of the materials.

The invention is described in further detail above in conjunction with specific preferred embodiments, but the specific implementations of the invention are not limited to these preferred embodiments described above. Those ordinarily skilled in the art can make some simple deductions or substitutions without departing from the concept of the invention, and all these deductions or substitutions should fall within the protection scope of the invention.

What is claimed is:

1. A water pressure trapdoor model test device, comprising a PIV analysis unit, a liquid material, a solid material, pore water pressure gauges, soil pressure sensors, a test box and a pressurizing unit, wherein the soil pressure sensors comprise first soil pressure sensors, second soil pressure sensors and third soil pressure sensors, a box body of the test box is provided with an opening which is sealed by a base plate, a hole is formed in the base plate, a trapdoor is arranged at the hole and is able to move upwards and downwards, the third soil pressure sensors are arranged in the trapdoor, the first soil pressure sensors are arranged in the base plate, the solid material is placed on the base plate, the second soil pressure sensors and the pore water pressure gauges are arranged in the solid material, the liquid material is placed on the solid material, a set space allowing a gas to be filled therein is reserved between the liquid material and an inner wall of a top cover of the box body of the test box, the pressurizing unit is connected to the test box and is configured to fill the gas in the test box, and the PIV analysis unit is configured to record the development and intensification law of soil arching effect in the test box.

2. The water pressure trapdoor model test device according to claim 1, wherein the base plate comprises a first cushion block, a prop and a base, the prop is mounted below the first cushion block and located on the base, and the first soil pressure sensors are arranged in the first cushion block.

3. The water pressure trapdoor model test device according to claim 2, wherein the trapdoor comprises a trapdoor module and a driving device for driving the trapdoor module to move upwards and downwards; and the trapdoor module comprises a second cushion block, a telescopic prop and a pedestal, the second cushion block is mounted on the pedestal by means of the telescopic prop, and the third soil pressure sensors are arranged in the second cushion block.

4. The water pressure trapdoor model test device according to claim 3, wherein the base plate comprises multiple said first cushion blocks and multiple said props, and two said props are mounted below each said first cushion block; the trapdoor module comprises multiple said second cushion blocks, and one or more said second cushion blocks are mounted on the telescopic prop; and the trapdoor comprises one or more said trapdoor module.

5. The water pressure trapdoor model test device according to claim 1, wherein the water pressure trapdoor model test device comprises multiple said pore water pressure gauges, the solid material is filled in the test box layer-by-layer, and the second soil pressure sensors and the pore water pressure gauges are arranged on each layer of the solid material at a set interval in a horizontal direction and a vertical direction of the water pressure trapdoor model test device respectively.

6. The water pressure trapdoor model test device according to claim 1, wherein the top cover, a left wall, a right wall and a rear panel of the box body of the test box are provided with bulges which protrude outwards, and an observation window is arranged on the box body of the test box and located on a front panel of the box body of the test box.

7. The water pressure trapdoor model test device according to claim 6, wherein the top cover, the left wall, the right wall and the rear panel of the box body of the test box are each provided with one or more bulges which protrude outwards; the multiple bulges on the top cover of the box body of the test box form a wavy shape; the top cover, the left wall, the right wall and the rear panel of the box body of the test box are made from steel plates or aluminum plates; and the observation window is a flat panel, and the flat panel is made from transparent organic glass.

8. The water pressure trapdoor model test device according to claim 1, wherein the solid material comprises sand, soil, gravel and glass beads, and the liquid material comprises water, glycerin and mud; the PIV analysis unit comprises a camera device and a PIV analysis system configured to record the development and intensification law of soil arching effect within the test box; the water pressure trapdoor model test device further comprises a vent pipe and a sealing ring, a through-hole is formed in the box body of the test box, the vent pipe has an end penetrating through the through-hole to enter the box body of the test box as well as an end connected to the pressurizing unit, and the sealing ring is mounted between the vent pipe and the through-hole; and the water pressure trapdoor model test device further comprises a data collection system configured to record data on the soil pressure sensors and the pore water pressure gauges.

9. The water pressure trapdoor model test device according to claim 8, wherein the pressurizing unit comprises an air compressor, a pressure gauge and a data conditioning system, the data conditioning system is connected to the air compressor and the pressure gauge, the air compressor is connected to the pressure gauge, and the pressure gauge is connected to the vent pipe.

10. A use method of a water pressure trapdoor model test device, comprising: Step 1, preparing a solid material according to a particle size distribution curve required by a test, and adding a liquid material of a corresponding concentration and comprising corresponding components according to test requirements; Step 2, determining a number and moving direction of trapdoors, and ensuring that a trapdoor module is as high as a base plate before the test materials are filled; Step 3, arranging first soil pressure sensors in a first cushion block of the base plate, filling the solid material in a test box layer-by-layer, arranging second pressure sensors and pore water pressure gauges in the solid material at a set interval, and arranging third soil pressure sensors in a second cushion block of the trapdoor module; Step 4, reading data on the soil pressure sensors and the pore water pressure gauges, recording the data after the data becomes stable, then adding the liquid material into the test box to a specified level, and waiting until read data becomes stable again; Step 5, filling a gas into the test box according to a pressure condition required by the test; when a reading of a pressure gauge reaches a specified value, waiting for a period of time during which an air compressor is kept in an on-state to the end of the test; and Step 6, starting a PIV analysis unit, then starting the trapdoor module, driving the trapdoor module to ascend or descend, recording the development and intensification law soil arching effect within the test box by the PIV analysis unit, and recording data on the soil pressure sensors and the pore water pressure gauges by a data collection system; wherein, in Step 3, the second soil pressure sensors and the pore water pressure gauges are arranged on each layer of the solid material at the set interval in a horizontal direction and a vertical direction of the water pressure trapdoor model test device respectively; in Step 5, a gas pressure in the test box is servo-controlled by the data conditioning system to ensure that the pressure in the test box is constant.

* * * * *